United States Patent [19]

Pelham

[11] 4,305,213
[45] Dec. 15, 1981

[54] NURSERY TREE REMOVER

[76] Inventor: Phillip M. Pelham, R.R. 5, McMinnville, Tenn. 37110

[21] Appl. No.: 123,082

[22] Filed: Feb. 20, 1980

[51] Int. Cl.³ ............................................ A01G 23/04
[52] U.S. Cl. ........................................ 37/2 R; 171/50
[58] Field of Search ...................... 171/50, 53, 54, 55, 171/56, 59, 62; 37/2 R, 2 P; 152/DIG. 5

[56] References Cited

U.S. PATENT DOCUMENTS

| | | | |
|---|---|---|---|
| 2,770,076 | 11/1956 | Kluckhohn | 37/2 R |
| 2,964,860 | 12/1960 | Daniels | 37/2 R |
| 3,594,931 | 7/1971 | Yost | 37/2 R |
| 3,601,174 | 8/1971 | Shotwell et al. | 152/DIG. 5 |
| 3,603,424 | 9/1971 | Blood | 180/6.2 |
| 3,885,375 | 5/1975 | Solterbeck | 56/DIG. 11 |

Primary Examiner—Robert A. Hafer
Attorney, Agent, or Firm—Pitts & Kesterson

[57] ABSTRACT

This invention involves new and unique apparatus suitable for safely and quickly removing a row of bare root nursery trees. More particularly, this invention teaches a lightweight and raised frame which supports a plow or blade, a power source, a seat for the operator and the controls. Weighted wheels are attached to the lightweight frame by four support members such that the wheels straddle a row of trees to be removed as the frame moves over the top of the row of trees. A U-shaped blade or plow is forced into the earth such that the blade cuts under and around the trees as the apparatus moves along a row of trees and the blade moves under the row of trees. Thus, the trees can be easily removed and the dirt shaken therefrom after the apparatus has moved past. According to one embodiment, a power source such as a small gasoline engine drives a hydraulic pump which is then used to hydraulically actuate the blade and to provide hydraulic power to four small hydraulic motors for independently driving the wheels. Thus, the lightweight frame and the weighted wheels of this invention results in four-wheel drive apparatus which is not top heavy and which is inherently safer than apparatus heretofore available.

10 Claims, 6 Drawing Figures

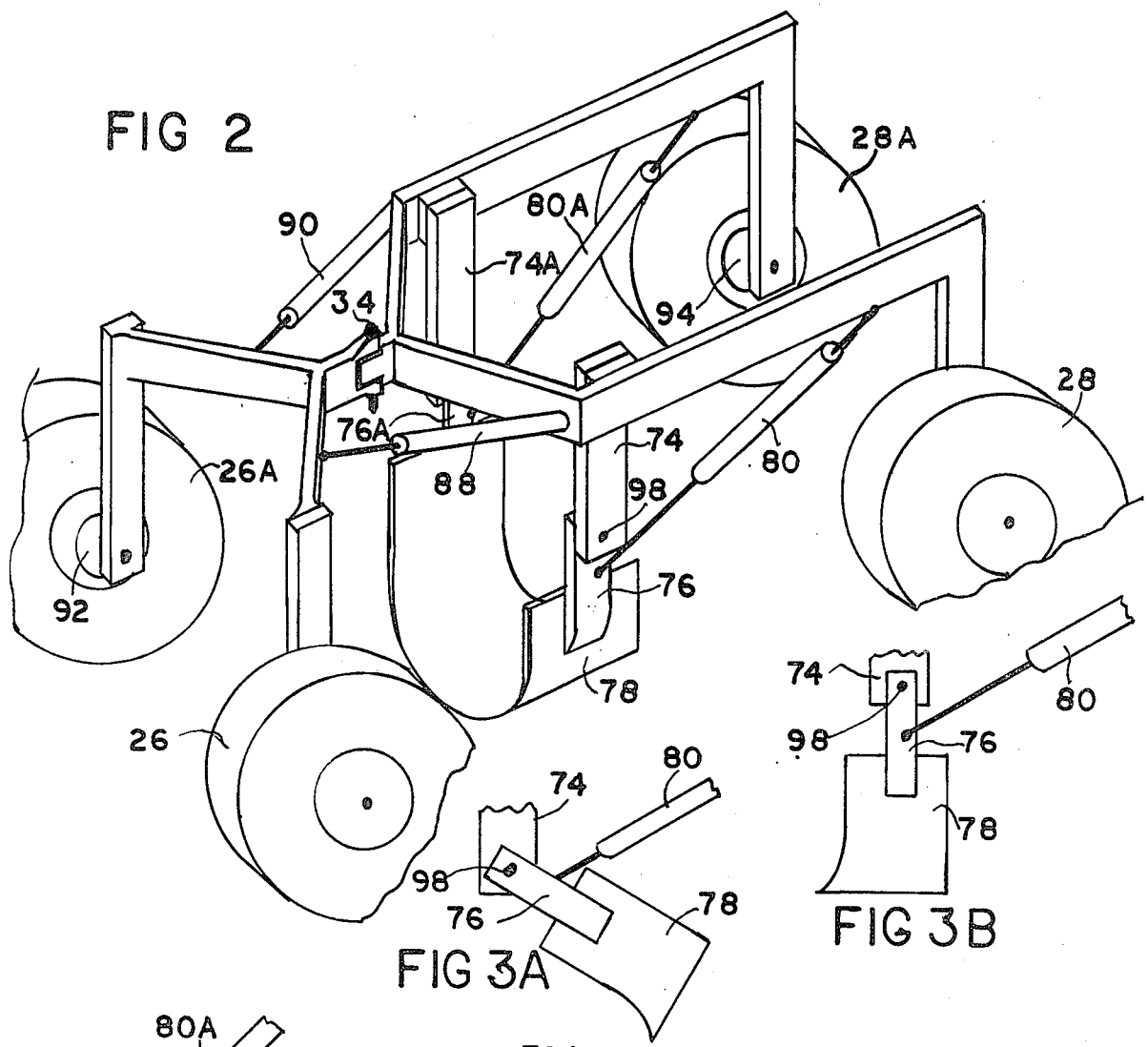
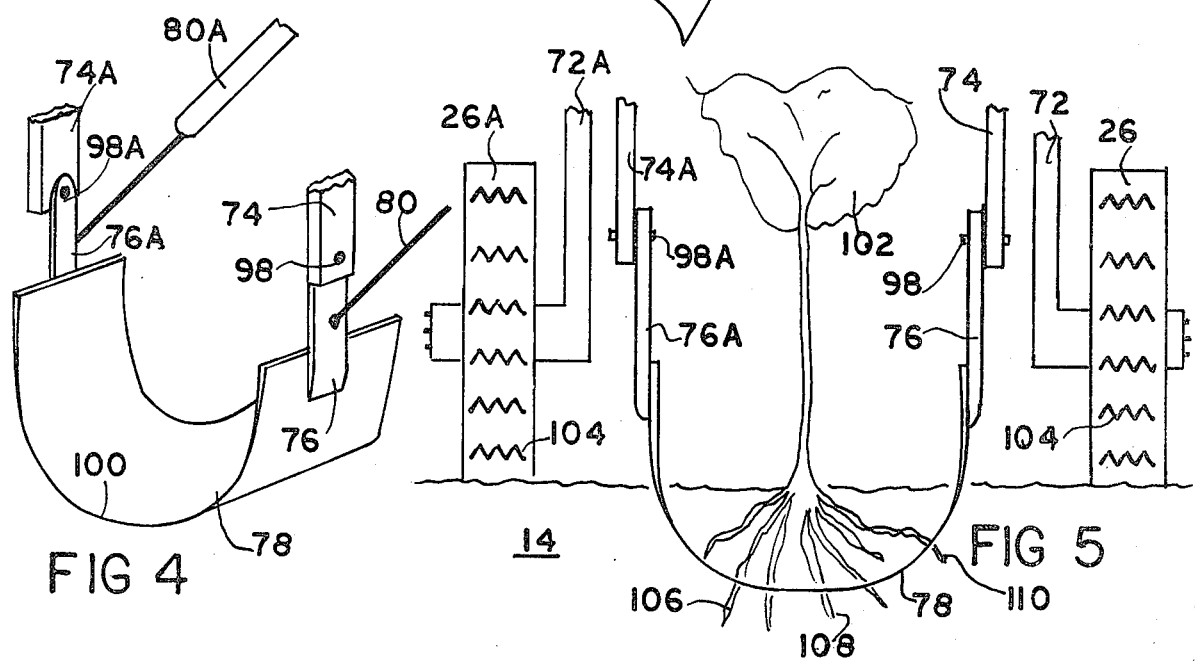

NURSERY TREE REMOVER

BACKGROUND OF THE INVENTION

This invention relates to nursery tree removers, and more particularly to nursery tree removers that result in bare root trees rather that the ball and burlap type nursery trees. More particular, this apparatus is inexpensive, lightweight and substantially safer than any other similar type apparatus presently available.

Various types of bare root nursery tree removers as well as the ball and burlap type tree remover are available on the market. However, each of these presently available devices are either extremely expensive, very cumbersome and heavy, and often quite unsafe. In the past, nursery trees were manually removed by shovel and other hand digging devices. However, in this age of automation and the cost of high labor, such manual labor for removing huge numbers of nursery trees for retail sale make the cost of manually removing nursery trees prohibitively expensive.

Many of the presently available machines for removing nursery trees are simply modified existing tractors and the like. For example, the John Deere Company manufactures a nursery tree remover which is substantially their basic small 450 model bulldozer on raised treads. The bulldozer is raised approximately 5 feet above its normal height, and includes a centrally located chute to allow for the passage of trees underneath. Unfortunately, this machine is expensive, top heavy and consequently tends to tilt or tip over. Furthermore, it is substantially impossible for the operator to see the ground and thus carefully remove the small, tender nursery trees. The danger of a bulldozer turning over while being driven by an operator is readily apparent and obvious. In addition to modifying equipment such as a bulldozer, other tractor add-on equipment has been built for purposes of removing bare root nursery trees. In particular, a side operated cutter blade has been built which can be mounted to the side of a tricycle-type tractor. Such a cutter or digger was built and installed by Bauldin and Lawson, Co., McMinnville, Tenn. This type digger which is perhaps the most commonly used in the industry, has difficulties in that it is side mounted. For that reason, as digging takes place, the tractor tends to pull sideways while in use. This causes the driver of the tractor to continuously hold the brakes on the opposite side thereby leaving one tire pulling the tractor, reducing the available pulling power of the tractor and wasting energy. Because of its width, this type device also tends to scrape and scar other surrounding tender nursery trees. Furthermore, this type device becomes almost inoperative in wet and muddy conditions.

In addition to these devices, there are many other devices that have been put on the market as much effort has been devoted to develop a suitable machine. Consequently, a number of patents have issued which relate to such nursery equipment. For example, U.S. patents such as U.S. Pat. No. 2,779,111 issued to A. D. Cartwright, Jr. on Jan. 29, 1957; U.S. Pat. No. 2,964,860 issued to F. P. Daniels, Jr. on Dec. 20, 1960; U.S. Pat. No. 3,594,931 issued to K. J. Yost on July 27, 1971; and U.S. Pat. No. 3,977,099 issued to John E. Stewart on Aug. 31, 1976 all show machinery for removing nursery plants and small trees, shrubbery and the like in such a manner that the removed plants carry with them a large amount of soil for the roots of the trees. Each of these devices uses a cutting means which is forced into the ground surrounding the plant which is to be removed. For example, the U.S. Pat. No. 2,964,860 patent uses a cylindrical cutter which is simply forced into the ground around the plant to be removed. This patent also includes means by which the cylinder can be opened so it can encircle the plant, and also so that once the plant is removed with its surrounding soil, the surrounding soil can be separated from the cutter so that burlap can be used to surround the roots of the tree and the soil. The U.S. Pat. No. 2,779,111 patent is primarily for use with small shrubs which are only about a foot above the surface of the earth. On the other hand, the U.S. Pat. No. 2,964,860 patent which operates substantially similar to the U.S. Pat. No. 2,779,111 patent is for use in removing small trees and bushes.

The U.S. Pat. No. 3,594,931 patent has some similarity with the patents already discussed, except that it is a very high machine, such that the body of the machine rides over the top of small trees. The apparatus of the U.S. Pat. No. 3,594,931 patent also includes means out in front of the apparatus for reaching to the tree to be removed. In addition, the cylindrical cutter of the U.S. Pat. No. 3,594,931 patent has a toothed cutting edge which rotates to cut through the earth as it is pushed deep around the roots of the tree. In addition, this device also includes a tap root or bottom root severing line which pulls across the bottom of the cutting cylinder to cut all remaining earth and roots of the tree prior to removal of the plug containing soil and the tree from the earth.

The U.S. Pat. No. 3,977,099 patent also results in a tree being removed from the earth still having a portion of soil still surrounding its roots for purposes of providing a tree which can be prepared as a ball and burlap type plant. However, this device includes a spherical type cutter which is placed around the tree and then uses two semi-spherical cutters which are forced in an arc so that substantially a sphere of soil surrounding the tree roots is produced. The hemispherical cutters cut the roots and the soil and then lifts the entire tree and soil combination out of the earth so that it can be wrapped in burlap for further protection.

In addition, U.S. Pat. No. 3,912,276 issued to J. L. Juhl on May 19, 1970, shows a apparatus using a U-shaped blade which is forced into the earth such that it can scoop a small tree and a portion of soil with it out of the earth so that the soil and tree roots can be bound in burlap. However, the device must lift up each soil and tree combination and set it aside before advancing down a row of trees to remove a second and subsequent member of trees. For each of the devices discussed heretofore, it will be appreciated that unlike the present invention, they are for removing trees or shrubbery or other plants from the earth which still have a portion of soil surrounding the roots such that the tree and the surrounding soil can be covered in a burlap bag for shipping. None of these devices are particularly suitable for quickly removing small nursery trees as bare root trees and consequently, a great deal more time and effort and expense is required for producing trees with a ball and burlap protected root system.

Thus, it will be appreciated although the devices discussed heretofore, are suitable for the removal of plants in a nursery, etc., none of the devices disclose the unique apparatus and combination as disclosed in the present invention.

SUMMARY OF THE INVENTION

Accordingly, it is an object of the present invention to provide an inexpensive, lightweight and safe apparatus for removing nursery trees as bare root trees.

A further object of this invention is to provide a nursery tree remover which does not damage and scar the tender surrounding nursery trees.

It is still another object of this invention to provide a nursery tree remover which can remove a row of trees without starting and stopping the apparatus.

It is still another object of this invention to provide nursery tree removing apparatus which is suitable for use in wet and muddy conditions, which is not top heavy and which does not tend to tilt or overturn easily.

It is yet another object of this invention to provide nursery tree apparatus which does not require a heavy duty driving power source.

It is also an object of this invention to provide a nursery tree apparatus which allows the operation of removing the trees to be readily observed by the operator of the equipment.

The above objects, as well as others, are accomplished according to the present invention by providing apparatus for removing a row of small nursery trees from the earth by the use of a lightweight frame which has a front and rear portion, and which supports the power source, a seat for the operator, and controls for steering and controlling a cutter blade. A pair of weighted front and rear wheels are attached by means of elongated front and rear members to the frame such that the frame will straddle and move over the top of a row of nursery trees as the left side of a pair of front and rear wheels, and a right side of a pair of front and rear wheels move on each side of a row of nursery trees. The frame is typically raised to a level of about 5 feet above the surface of the earth, and further includes (attached at substantially a center point) a U-shaped blade which can be forced into the ground such that it cuts the side and tap roots of the row of nursery trees as the apparatus powered by said power source moves along and under the row of trees. Also included is a means for forcing (such as hydraulic means) the U-shaped blade into the ground.

BRIEF DESCRIPTION OF THE DRAWINGS

FIG. 2 is a top perspective view of a stripped down embodiment of the present invention without the power source, controls and operator's seat for better illustrating the invention.

FIGS. 3A, 3B, and 4 show two side views and a perspective view of the cutter or blade used to cut through the earth and remove the trees according to the teachings of this invention.

FIG. 5 shows a portion of a front view of the apparatus of this invention and the cutter at work on a row of small nursery trees.

DETAILED DESCRIPTION OF THE INVENTION

Figure 1:
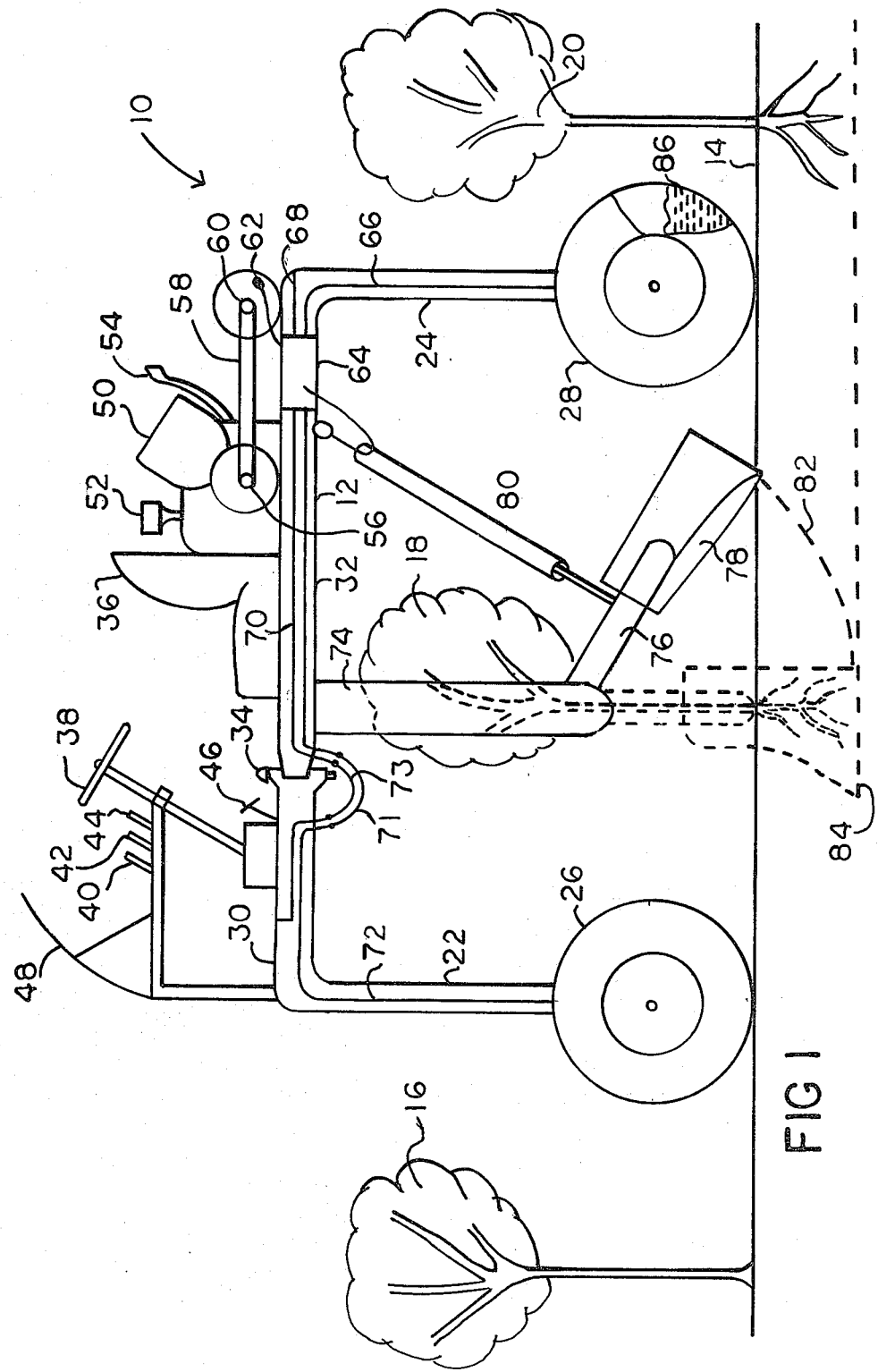
FIG. 1 is a side view of a nursery tree remover incorporating the features of this invention.

Referring now to FIG. 1, there is shown generally at 10 a side view of the apparatus of this invention in the process of removing small nursery trees. As is shown, the device includes a frame 12 which is raised a substantial distance above the earth 14 for purposes of substantially clearing the trees to be removed such as the trees shown at 16, 18, and 20. In a typical embodiment, frame 12 is located approximately 5 feet above the earth 14. Frame 12 is supported above the earth 14 by a pair of front support members 22 and rear support members 24. These support members 22 and 24 are permanently attached to frame 12 and rotatably attached to a pair of large front rubber tires 26 and a pair of large rear rubber tires 28. In the disclosed embodiment, frame 12 includes a front portion 30 and a rear portion 32 which portions 30 and 32 are joined or hinged by pin 34. It will be appreciated that according to other embodiments of this invention to be discussed hereinafter, hinge or pin 34 may not be required. Also supported by frame 12 is a seat 36 for an operator, which operator may steer the device by a steering wheel 38 and as necessary further control the device by hand levers 40, 42, and 44, as well as foot pedals such as shown at 46. Although trees 16, 18 and 20 as illustrated are no taller than the frame 12 itself, it will be appreciated that the machine could be used for trees that might be several feet taller and thus extend up to or above face shield 48. Thus, it will be appreciated that face shield 48 is provided to prevent the branches of trees brushing into the face of the operator. Also supported on the frame 12 is a primary power source 50 such as shown in the embodiment as a small gasoline or internal combustion engine having a carborator 52 and an exhaust 54. Attached to engine 50 is a fly wheel 56 which drives, by means of a belt 58, a hydraulic pump 60. Thus, hydraulic pump 60 provides hydraulic fluid through hose 62 to a distribution and control means 64. The distribution control means 64 thereby allows hydraulic fluid under pressure to be provided to four hydraulic motors (not shown) located at the hub of each of the four tires. Thus, it will be appreciated that there has been described to this point a frame and support members and wheels which supports a power source for moving the apparatus, and a seat and controls for controlling the apparatus.

As is shown, hydraulic lines 66, 68, 70, and 72 provide the hydraulic fluid under pressure to the individual hydraulic motors (not shown) located at each wheel. Also securely attached to the frame 12 are plow or blade support struts 74 and 74A. Typically attached to the plow support struts 74 and 74A, are plow arms 76 and 76A which are pivotally attached to support struts 74 and 74A and securely or permanently attached by welding or other means to plow or blade 78. Plow or blade 78 as will be seen more clearly in other figures and discussed hereinafter, is typically a U-shaped or V-shaped blade to which the pair of attaching arms are attached at the top of the U or V-shape. Also attached to attaching arm 76 are a pair of hydraulic cylinders 80 and 80A which receive their hydraulic power from hydraulic distribution control means 64. In operation, it will be appreciated that by extending hydraulic cylinders 80 and 80A, the plow or blade 78 may be driven or forced into the ground along the arc 82 and to the position indicated by the dashed lines 84. Once driven into the ground by hydraulic cylinders 80 and 80A, it will be appreciated that by moving the apparatus down a row of trees such as trees 16, 18, and 20, from a position such that the pair of front wheels 26 and 26A and the pair of rear wheels 28 and 28A straddle said row of trees, blade 78 can simply cut through or force its way through the earth 14 so that it severs the tap roots and side roots of the tree as is seen more clearly in FIG. 5 to be discussed hereinafter. Unlike much of the prior art equipment the apparatus 10 is preferably made of lightweight steel or aluminum tubing. To establish a lower center of gravity, the pair of front wheels 26 and 26A and rear wheels 28 and 28A preferably include some means of weighting such as water, sand, or some other loose material which would tend to always move towards the lower portion of the wheel as is indicated by the liquid illustrated at 86 in rear wheel 28. Thus, by maintaining weight at the lowest possible point, the apparatus tends to be more stable and less top heavy. Further, the addition of the weight in the wheels itself and the use of four independent hydraulic motors to obtain four-wheel drive provides excellent traction in muddy and wet conditions.

As was discussed briefly above, although the embodiments shown in FIG. 1 discloses a gasoline or internal combustion engine driving a hydraulic pump 60, it will be appreciated that any suitable drive train and power source may be used. For example, it is possible that mechanical or chain type linkage from the power source 50 to the wheels could be devised. In a similar manner, drive shafts with universal joints in the like could also be devised. In a similar manner, the embodiment discloses a steering wheel 38 which may be used for steering the embodiment. For example, as will be discussed with respect to FIG. 2, steering wheel 38 could be used to drive hydraulic steering cylinders. However, it will be appreciated that it might be possible to eliminate a steering wheel in its entirety and simply use a braking and drive system to the wheels for purposes of steering, such as is used by certain bulldozers and other large earth moving machines. That is, since in the desired embodiment each wheel of the front pair 26 and 26A and the rear pair 28 and 28A are preferably driven by independent hydraulic motors, it will be appreciated that if the operator wishes the machine to turn to the left, he may either brake with the wheels on the left side of the device, with the result that the machine will turn left. Alternately, the operator may simply remove the driving power from the wheels on the left side and continue power to the wheels on the right side thereby achieving a turn to the left, or the operator can brake with the left wheels and provide power to the right wheels. It is also possible, of course, to simply brake the left front wheel to obtain a turn to the left. It will further be appreciated that although it is believed that a more effective apparatus can be achieved by using independent four-wheel drive, it will also be appreciated that driving power could be provided by two wheels. For example, the left and right rear wheels could be used to provide the necessary driving forces. In the event, the steering wheel 38 were eliminated, control levers such as 40, 42, 44, etc. or pedals 46 could be used to affect the steering and control of apparatus 10.

Referring now to FIG. 2, there is shown a perspective view of the apparatus of FIG. 1 in which view the operator, the power drive source, the hydraulic pump, and the steering mechanisms have been removed to better illustrate the operation of the apparatus. As shown in this embodiment there are included two hydraulic steering cylinders 88 and 90. It will be appreciated, that in a typical situation turning of the steering wheel 38 will result in the cylinders being activated such that the front portion 30 of frame 12 will pivot at the pin 34 in the desired direction. For example, if a left turn is desired the hydraulic pump 60 as shown in FIG. 2 will provide power on a selected basis to cylinder's 88 and 90 such that cylinder 88 is retracted and cylinder 90 is extended. Also as can be seen more clearly in this figure, each individual wheel 26 and 26A at the front, and 28 and 28A on the rear include a small hydraulic motor 92 as shown on wheel 26A, and 94 as shown on wheel 28A. As has been mentioned, the use of independent four-wheel drive also provides for excellent traction and use in wet and muddy conditions. In addition, as was discussed heretofore, different steering techniques can be used. In such an event, it may be possible or desirable that frame 12 be a one piece frame and not have a pivot point 34.

Referring now to FIGS. 3A, 3B, and 4, there are shown illustrations of the digging blade or plow as used with this invention. As shown, in FIG. 3A, plow or blade 78 is welded or permanently attached to plow arm 76 which in turn is typically attached to support member 74 at a pivot point 98. Also as is shown, the plow may be in the retracted position as shown in FIG. 3A when hydraulic cylinder 80 is retracted, or alternately it may be in the extended and digging position as shown in FIG. 3B when hydraulic cylinder 80 is extended. FIG. 4 shows a perspective view of the plow or blade shown in FIG. 3A and 3B in its digging position. As can be seen from FIG. 4, in addition to support member 74, plow arm 76, pivot point 78, and hydraulic cylinder 80, which items, as is shown in FIG. 1, are attached to the left side of frame 12, there is a similar support member 74A, plow arm 76A, pivot point 78A, and hydraulic cylinder 80A. Thus, the operation of the plow or blade can now be clearly illustrated. It will further be appreciated that edge 100 of plow blade 78 may be sharpened or have a cutting edge attached thereto for cutting or being forced through the earth 14.

Referring now to FIG. 5, there is shown a partial front view of the apparatus of this invention in a digging operation. As can be seen, large rubber wheels 26 and 26A which are supported by support member 72 and 72A which in turn support frame 12 are arranged such that the apparatus may cover or straddle a row of trees to be moved such as shown with tree 102. As can be seen, wheels 26 and 26A are typically large, rubber tractor wheels with mud cleats or lugs 104. Thus, it will be appreciated that the independent four-wheel drive apparatus being lightweight and having a substantial amount of this weight concentrated in the wheels, is particularly suitable for use in wet or muddy conditions. Also as is shown, once the blade 78 is forced into the earth 14, the apparatus simply rolls forwad so that it cuts the tap roots and side roots such as shown at 106, 108, and 110 of a tree to be removed as it advances. Thus, as is shown in FIG. 1, as the tractor advances, it simply leaves the tree with its roots cut as is illustrated by tree 20 in FIG. 1 so that nursery personnel may simply come along and grab the tree by the trunk and shake the dirt and roots loose and thereby be provided with a bare root tree ready for market.

Therefore, while there have been described what are at present considered to be preferred embodiments of this invention, it will obvious to those skilled in the art, the various changes and modifications may be made therein without departing from the invention, and the invention is, therefore, intended to cover all such changes and modifications as followed in the true scope and spirit of the invention.

I claim:

1. Apparatus having a low center of gravity for removing a row of trees from the earth comprising:

a lightweight horizontal frame having a front portion and a rear portion for supporting a power source, an operator, and controls;

a pair of vertical elongated front members having a first and further end and a pair of vertical elongated rear members having a first and further end, said first end of said pair of elongated front members being attached to said front portion of said frame, and said first end of said pair of elongated rear members being attached to said rear portion of said frame;

a blade support means connected to said horizontal frame, and centrally located between said front and rear wheels and substantially centrally located between said left and right wheels;

a "U" shaped blade connected to said blade support means having a shape suitable for being forced into and through the earth along a selected and continuous horizontal path under said row of trees such that said "U" shaped blade cuts off the tap and side roots of said row of nursery trees as said "U" shaped blade moves along said continuous horizontal path;

a weighted left front wheel, right front wheel, left rear wheel and right rear wheel, each of said weighted wheels being attached to corresponding further ends of said elongated front and rear members to raise said frame above said row of trees such that said front wheels and elongated front members and said rear wheels and elongated rear members can straddle said row of trees and move over said trees;

means for forcing said blade into said earth;

power means for driving said forcing means and for driving at least two of said wheels to move said apparatus and force said blade through the earth along and under said row of trees so that said trees can be readily removed from the earth; and control means for controlling said apparatus.

2. The apparatus of claim 1 wherein said wheels, are rubber tire type wheels which are weighted.

3. The apparatus of claim 2 wherein said rubber wheels are weighted by the addition of liquid to the interior of said tires.

4. The apparatus of claim 1 wherein said power means is a hydraulic pump driven by an internal combustion engine.

5. The apparatus of claim 4 wherein said hydraulic pump drives at least two independent hydraulic motors connected to at least two of said wheels.

6. The apparatus of claim 5 wherein said means for forcing said blade into the earth is a hydraulic cylinder driven by said hydraulic pump.

7. The apparatus of claim 4 wherein said means for forcing said blade into the earth is a hydraulic cylinder driven by said hydraulic pump.

8. The apparatus of claim 1 wherein said control means include means for steering by braking one of said front wheels at the same time said other front is free to rotate.

9. The apparatus of claim 1 wherein said frame is made of a lightweight tubing.

10. The apparatus of claim 1 having a low center of gravity wherein said low center of gravity is accomplished by adding weight to said wheels, and providing a lightweight frame.

* * * * *